(12) United States Patent
Yokota et al.

(10) Patent No.: US 7,756,091 B2
(45) Date of Patent: Jul. 13, 2010

(54) MOBILE NETWORK AND COMMUNICATION METHOD THEREOF

(75) Inventors: Hidetoshi Yokota, Saitama (JP); Takeshi Kubo, Saitama (JP); Akira Idoue, Saitama (JP); Masugi Inoue, Tokyo (JP); Mikio Hasegawa, Tokyo (JP); Homare Murakami, Tokyo (JP); Khaled Mahmud, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 795 days.

(21) Appl. No.: 10/549,108

(22) PCT Filed: Mar. 17, 2004

(86) PCT No.: PCT/JP2004/003597

§ 371 (c)(1), (2), (4) Date: Jul. 10, 2006

(87) PCT Pub. No.: WO2004/084507

PCT Pub. Date: Sep. 30, 2004

(65) Prior Publication Data

US 2006/0268817 A1 Nov. 30, 2006

(30) Foreign Application Priority Data

Mar. 17, 2003 (JP) ............................. 2003-072020

(51) Int. Cl.
*H04W 4/00* (2009.01)
*H04L 12/28* (2006.01)

(52) U.S. Cl. ....................................... 370/338; 370/258

(58) Field of Classification Search ................. 370/258, 370/401, 403, 405, 406, 338; 455/435
See application file for complete search history.

(56) References Cited

U.S. PATENT DOCUMENTS 6,549,522 B1 * 4/2003 Flynn ......................... 370/313

(Continued)

FOREIGN PATENT DOCUMENTS

JP   10-150451   6/1998

(Continued)

OTHER PUBLICATIONS

Translation of the International Preliminary Report on Patentability of International Application No. PCT/JP2004/003597, with Form PCT/IB/373 and Form PCT/ISA/237.

(Continued)

*Primary Examiner*—Vincent P Harper
*Assistant Examiner*—Omoniyi A Obayanju
(74) *Attorney, Agent, or Firm*—Westerman, Hattori, Daniels & Adrian, LLP

(57) ABSTRACT

A gateway (GW) and a plurality of foreign agents (FA) are connected in a ring-like manner, and the procedures of (1) the GW receiving an IP packet, addressed from a corresponding node CN to a mobile node MNa; (2) the GW transferring the packet to a link L1 in one direction; (3) an FA1 transferring the received packet to a link L2 in the same direction; (4) FA1 furthermore transferring the received packet to a link L4, connected to MNa, if the destination address of the received packet is already registered in the visitor list; (5) an FA2 transferring the received packet to a link L3 in the same direction; (6) FA2 furthermore ending the process as it is if the destination address of the received packet is not registered; and (7) the GW discarding the received packet.

4 Claims, 16 Drawing Sheets

U.S. PATENT DOCUMENTS 6,973,057 B1 * 12/2005 Forslow ...................... 370/328
2002/0078238 A1 * 6/2002 Troxel et al. ................ 709/245

FOREIGN PATENT DOCUMENTS

| JP | 11-252182 | 9/1999 |
|----|-----------|--------|
| JP | 2002-223236 | 8/2002 |
| JP | 2002-281069 | 9/2002 |
| JP | 2002-344479 | 11/2002 |
| WO | WO 02/35738 | 5/2002 |

OTHER PUBLICATIONS

C Perkins, Ed., "IP Mobility Support for IPv4", RFC3344, IETF, Aug. 2002.

Eva Gustafsson, et al. "Mobile IPv4 Regional Registration, draft-ietf-mobileip-reg-tunnel-07", IETF, Oct. 2002.

Japanese Office Action dated Apr. 12, 2006 for Application No. 2003-072020.

* cited by examiner

MOBILE NETWORK AND COMMUNICATION METHOD THEREOF

TECHNICAL FIELD

This invention relates to a mobile network and a communication method for the same and particularly relates to a mobile network and a communication method for the same with which the data transfer rate does not fall readily even when the number of mobile nodes increases.

BACKGROUND ART

Mobile IP is standardized as an art for enabling continuous communication using the same IP address even when a mobile node moves among different networks (IP Mobility Support for IPv4, RFC3344, IETF 2002).

With the Mobile IP protocol, each time a mobile node moves to a different network, the location of the mobile node must be registered with a home agent, and the resulting processing delay has been an issue. As one method of resolving this issue, localized location registration, wherein mobility agents, which bear the functions of location management and data transfer, are hierarchized and movement within a narrow range is accommodated by registration with just an intermediate mobility agent, has been proposed (Mobile IPv4 Regional Registration, "draft-ietf-mobileip-reg-tunnel-07," IETF 2002.).

FIG. 31 shows a network arrangement for carrying out localized registration. Foreign agents (FAs), which perform location management of mobile nodes (MNs) in a mobile network, are hierarchized by means of RFAs (Regional FAs) and GFAs (Gateway FAs), and when an MN moves inside the domain of an FA under an RFA or GFA, localized registration is carried out just in regard to the RFA or GFA.

With the conventional localized registration, since the FAs are hierarchized, a routing process is executed at each FA along the path before a packet reaches a mobile node within a mobile network, and this causes increased delay. There is also the issue that the higher the rank of an FA, the greater the number of mobile nodes that it must hold for path control.

FIG. 32 schematically shows the mobile node information that each FA must accommodate when the FAs are positioned hierarchically and shows that the higher the rank of an FA, the more mobile node information it must hold.

Here, in the case of the ordinary internet (fixed network), since the address system is managed so as to be coordinated with the connection system of the network, hierarchization consolidates the path information and is thus effective in terms of scalability.

On the other hand, with a mobile network in which nodes move about freely, since the address allocated to a mobile node is not necessarily coordinated with the address system of the network to which the mobile node is connected, scalability effects cannot be obtained by hierarchization. An upper-ranking FA must thus hold information of all mobile nodes under its domain, and this increases the processing load and has been a bottleneck in terms of scalability.

Also, with the mobile IP standard, the function of simultaneous bindings, with which the registrations of a plurality of addresses are held and data are transferred to these addresses, is defined in the home agent (HA). Thus for an MN to start communication at a destination, not only registration with the FA but registration with the HA must also be completed, and if registration with the HA is not completed, communication cannot be started even if registration with the FA is completed.

Furthermore with the mobile IP standard, packets to be sent to an MN are all sent to the HA regardless of the current location of the MN and since the packets are encapsulated at the HA for sending to the FA and then transferred, the packet transmission path becomes long inevitably and increased traffic is caused. In addition, since the encapsulation process at the HA and a decapsulation process at the receiving FA are required, the resulting delays cause lowering of the communication efficiency.

An object of this invention is to provide a mobile network and a communication method for the same, with which the processes for registration are simplified and the lowering of the data transfer rate is restrained by decreasing the number of mobile nodes for which each agent is to perform location management.

As with the present invention, since an IP packet transferred to the gateway GW from the external network is passed through all of the FAs regardless of its destination, the GW does not need to manage the accommodation location of each mobile node and does not have to execute a routing process. Also, since the routing process within the network is restricted to the FA that accommodates the mobile node, the processing speed is improved.

DISCLOSURE OF INVENTION

In order to achieve the above object, the present invention provides in a communication method for a mobile network, wherein a gateway (GW) and a plurality of foreign agents (FAs) are provided, and corresponding nodes (CNs), on an exterior network that is connected to the GW, communicate with mobile nodes (MNs), on the mobile network, via the above-mentioned GW and FAs, a mobile network communication method wherein the GW and the plurality of FAs are connected in a ring-like manner.

This invention is characterized in that, in such a ring-like mobile network, the procedures of: an MN requesting one foreign agent FA for registration; the above-mentioned one FA registering the address of the above-mentioned MN in its own visitor list in response to the above-mentioned registration request; the GW receiving data sent from a CN and addressed to the MN; the above-mentioned GW transmitting the data to an FA neighbor in one direction, this FA transmitting the data to another FA neighbor in the same direction, and this being repeated; each FA, to which the data have been transferred, searching for the destination address in its own visitor list; and the FA, for which the address of the received packet is already registered in the visitor list, transmitting the received packet to the link to which the MN is connected; are executed.

BEST MODE FOR EMBODYING THE INVENTION

Figure 1:
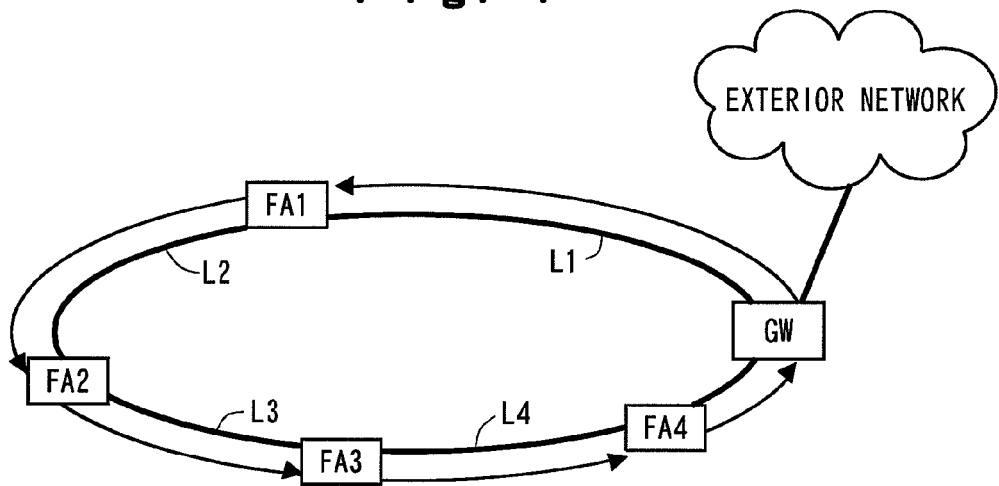
FIG. 1 is a block diagram showing a first embodiment of a mobile network to which this invention is applied.

Preferred embodiments of this invention shall now be described in detail with reference to the drawings. FIG. 1 is a block diagram showing the arrangement of a first embodiment of a mobile network to which this invention is applied, and in this embodiment, a gateway (GW) and a plurality (four in the present embodiment) of foreign agents (FAs) are connected in a ring-like manner in the order of: GW R FA1 R FA2 R FA3 R FA4 R GW; and this network is connected to an external network, such as the internet, at the GW. In the present embodiment, IP packets, which are issued from mobile nodes (MNs) and addressed to the MNs, are circulated in a predetermined one-neighbor direction (the counterclockwise direction in the FIGURE in the present embodiment) along such a ring-like mobile network (which may be referred to simply as a "ring-like network" at times).

With the first embodiment, since the MNs accommodated by each FA acquire IP addresses on the ring network, all MNs are deemed to have such network addresses. The IP addresses used in this ring-like network have the same prefix PF and the GW can perform path control of all IP addresses having this prefix PF. In the second embodiment to be described below, the IP address of an MN is that of a home network.

The registration procedure and data transfer procedures of mobile nodes in the first embodiment shall now be described in detail.

A: Registration Procedure

Figure 2:
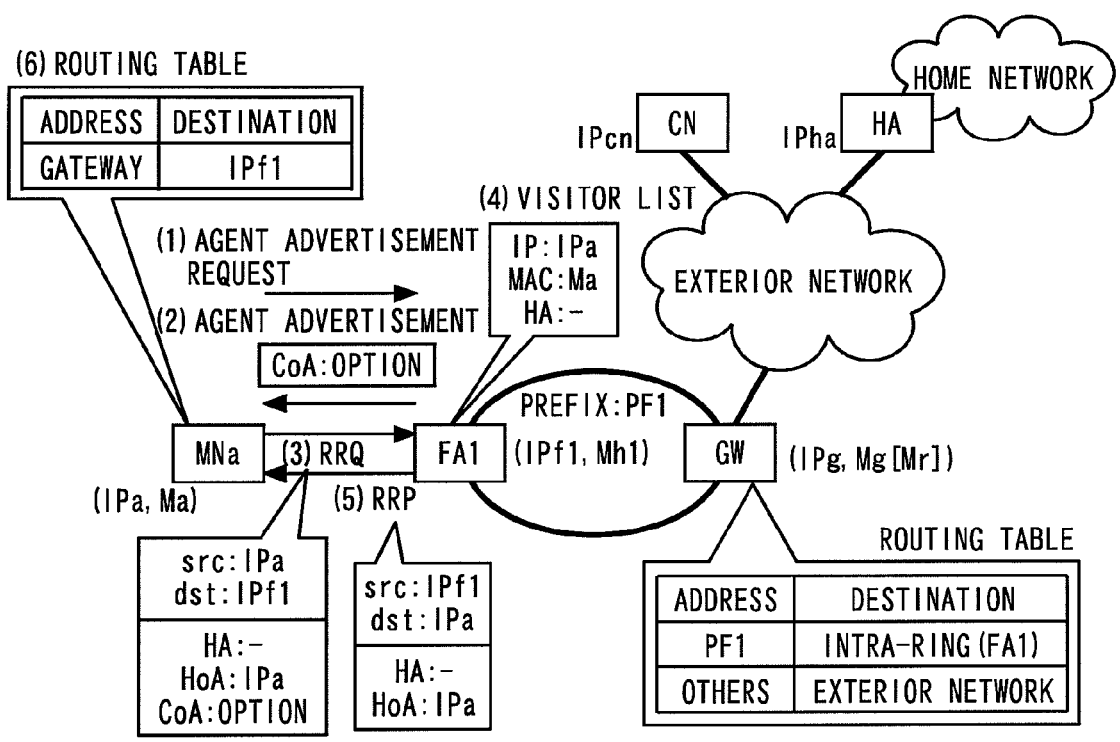
FIG. 2 is a block diagram that illustrates the registration procedure of the first embodiment.
Figure 3:
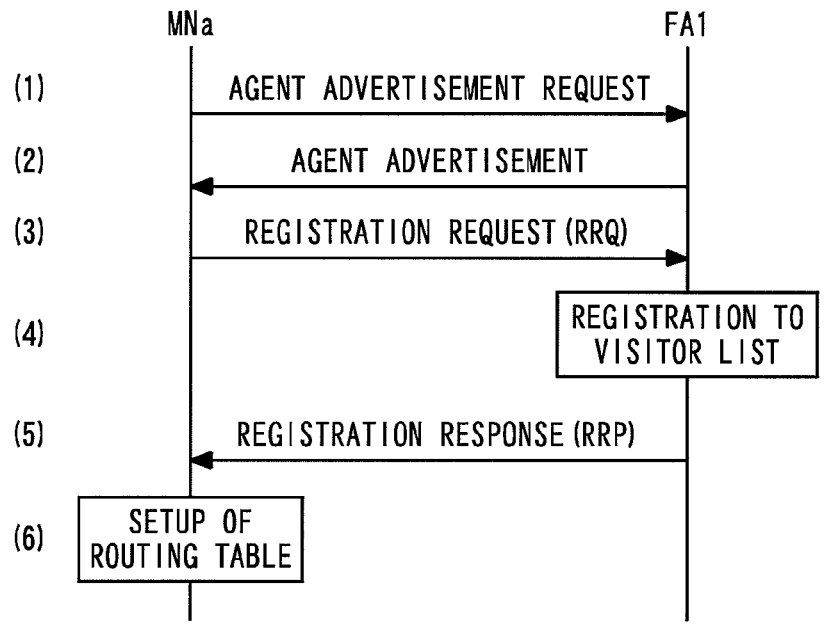
FIG. 3 is a sequence diagram that illustrates the registration procedure of the first embodiment.

FIGS. 2 and 3 are a block diagram and a sequence diagram, respectively, that illustrate the registration procedure of the first embodiment, with nodes (agents) that are unnecessary for the description being omitted from illustration.

Here, the IP address of a home agent (HA) belonging to a home network is IPha, the IP address of a corresponding node (CN) connected to the external network is IPcn, the IP address and the MAC address of the gateway GW are IPg and Mg, respectively, the IP address and MAC address of a foreign agent FAn (FA1, FA2 . . . FAn) are IPfn and Mfn, respectively, and the IP address and the MAC address of a mobile node MNa are IPa and Ma, respectively. In addition to the MAC address Mg, the above-mentioned GW furthermore has a MAC address Mr that can only be received by the GW, and this MAC address Mr is known in all of the FAs.

(1) Prior to registration, MNa broadcasts or multicasts an Agent Advertisement Request.

(2) An FA (FA1 in the present case) that receives the Agent Advertisement Request broadcasts or multicasts an Agent Advertisement.

(3) To FA1 that sends the Agent Advertisement, MNa generates a Registration Request (RRQ) that contains MNa's own IP address and MAC address and sends this message upon registering its own IP address (IPa) as the source address (src) and the IP address (IPf1) of FA1 as the destination address (dst) therein. Here, the address of home agent HA is set to NULL (0).

(4) Upon receiving the IP address (IPa) and the MAC address (Ma) from MNa, FA1 registers these in the visitor list of its own node.

(5) If an address that is effective as that of an HA is not stored in the visitor list, FA1 furthermore generates a Registration Reply (RRP) that contains its own IP address (IPf1) and MAC address (Mf1) and sends this message upon registering its own IP address (IPf1) as the source address (src) and the IP address IPa of MNa as the destination address (dst).

(6) Upon receiving the above-mentioned RRP from FA1, MNa registers the IP address (IPf1), registered in the RRP, as the gateway IP address in its own routing table.

B: CN→MNa Data Transfer Procedure

Figure 4:
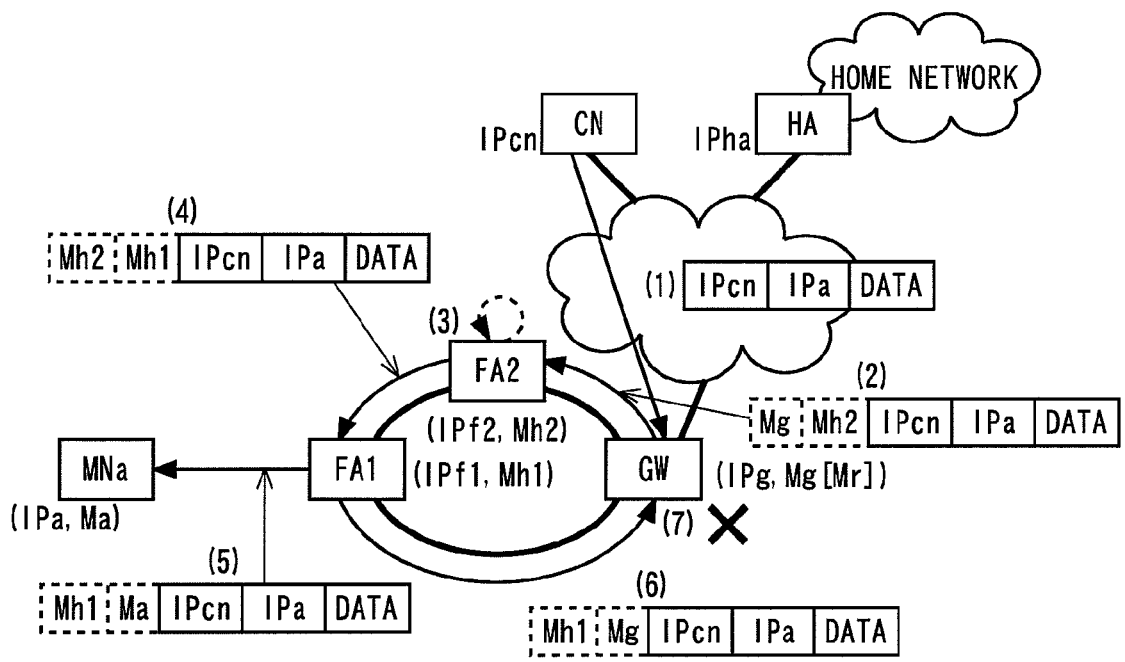
FIG. 4 is a block diagram that illustrates the procedure of data transfer from CN to MNa of the first embodiment.
Figure 5:
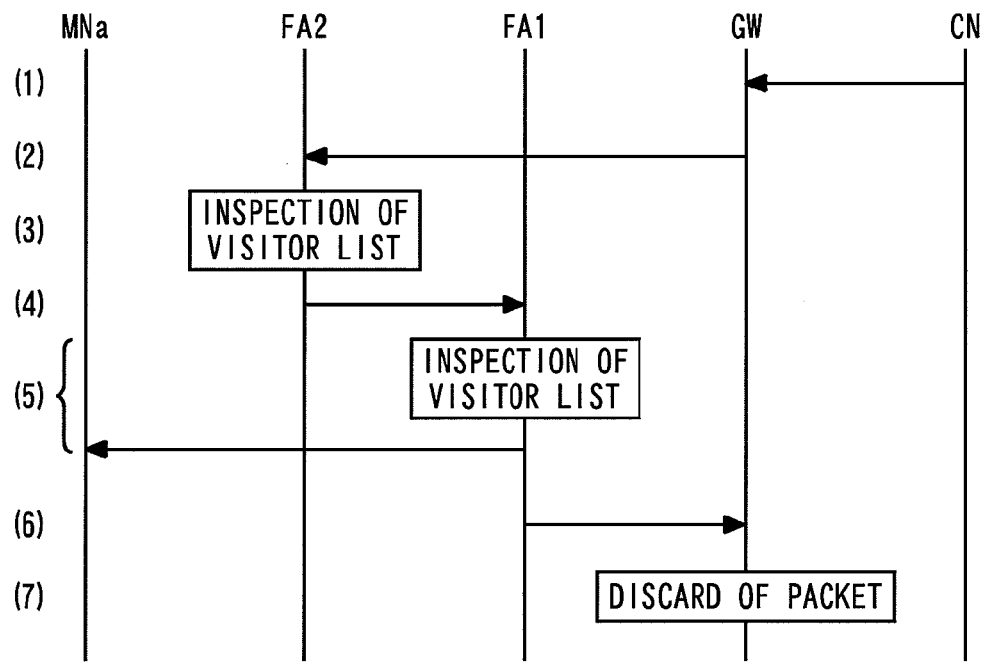
FIG. 5 is a sequence diagram that illustrates the procedure of data transfer from CN to MNa of the first embodiment.

FIGS. 4 and 5 are a block diagram and a sequence diagram, respectively, that illustrate the procedure of data transfer from the CN on the external network to MNa on the ring-like network, with nodes that are unnecessary for the description being omitted from illustration.

(1) In an IP packet sent from the CN and addressed to MNa, the IP address (IPcn) of the CN is registered as the source address and the IP address (IPa) of MNa is registered as the destination address. This IP packet arrives at the GW by normal IP routing.

(2) The GW attaches its own MAC address (Mg) as the source address and the MAC address (Mh2) of FA2, connected to a neighbor link in a predetermined direction of the ring (the FA2 link in the counterclockwise direction in the present embodiment), as the destination address to the received IP packet, and sends the IP packet to the FA2 link.

(3) Upon receiving the IP packet from the GW, FA2 inspects whether or not the destination MAC address of this IP packet is registered in the visitor list, and here, since this address is not registered, ends the inspection as it is.

(4) FA2 furthermore rewrites the source address and the destination address of the received IP packet to its own MAC address (Mh2) and the MAC address (Mh1) of FA1, respectively, and transfers the packet to the FA1 link in the counterclockwise direction in the same manner as the above.

(5) FA1 inspects whether or not the destination MAC address of the IP packet received from FA2 is registered in the visitor list, and here, since it is judged that the address is registered, transfers the IP packet to the link to which MNa is connected, and MNa then receives the packet.

(6) FA1 furthermore rewrites the source address and the destination address of the received IP packet to its own MAC address (Mh1) and the MAC address (Mg) of the GW, respectively, and transfers the packet to the GW link in the counterclockwise direction in the same manner as the above.

(7) The GW inspects the IP packet received from FA1 and discards the packet if the packet was sent by the GW itself.

C: MNa→CN Data Transfer Procedure

Figure 6:
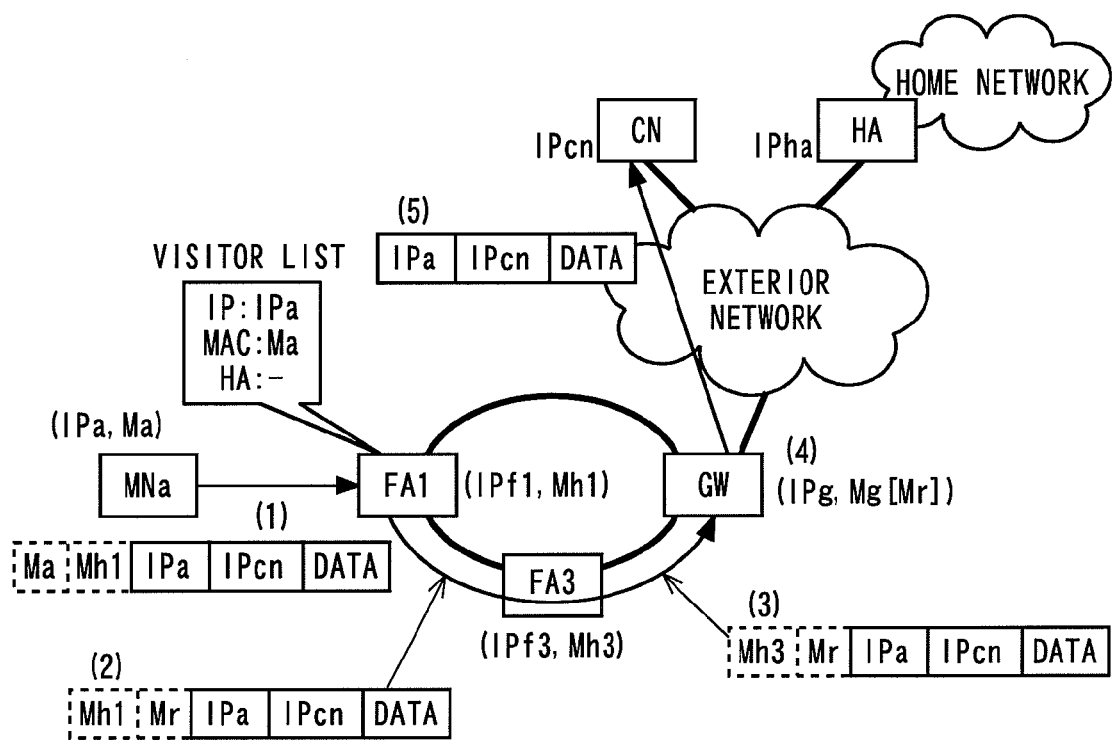
FIG. 6 is a block diagram that illustrates the procedure of data transfer from MNa to CN of the first embodiment.
Figure 7:
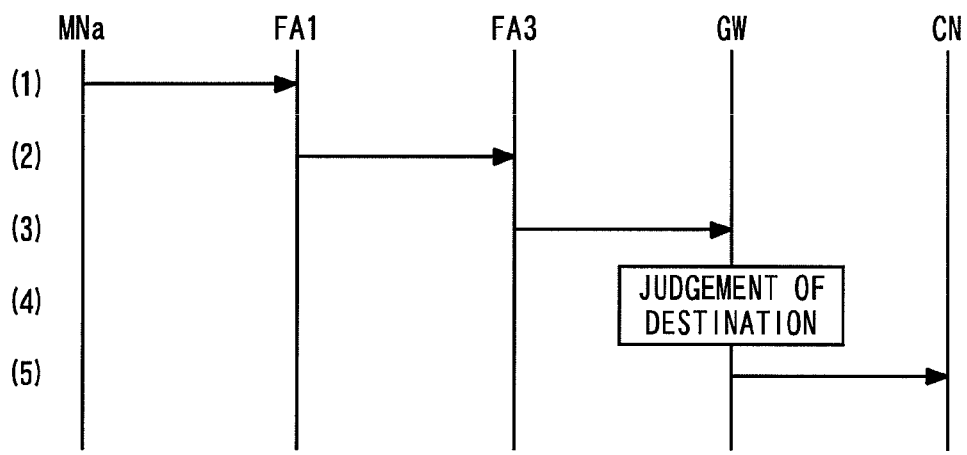
FIG. 7 is a sequence diagram that illustrates the procedure of data transfer from MNa to CN of the first embodiment.

FIGS. 6 and 7 are a block diagram and a sequence diagram, respectively, that illustrate the procedure of data transfer from MNa on the ring-like network to the CN on the external network, with nodes that are unnecessary for the description being omitted from illustration.

(1) To a CN-addressed IP packet, with which MNa's own IP address (IPa) and the IP address (IPcn) of the CN are registered as the source address and the destination address, respectively, MNa furthermore registers its own MAC address (Ma) and FA1's MAC address (Mh1), which is registered as the gateway IP address in MNa's own routing table, as the source address and the destination address, respectively, and sends the IP packet.

(2) Upon receiving the CN-addressed IP packet from MNa, FA1 recognizes, based on the destination address, that the IP packet is addressed to the external network, registers its own MAC address (Mh1) and the MAC address (Mr) of the GW as the source address and the destination address, respectively, and sends the packet to a neighbor link in one direction.

(3) The IP packet is transferred to the GW upon undergoing the same procedure at FA3.

(4) The GW judges whether or not the prefix of the destination address is that of the exterior of the ring.

(5) The GW transfers the IP packet, for which the destination is outside the ring, to the external network. The IP packet that has been transferred to the external network is transferred to the CN in accordance with normal IP routing.

D: MNb→MNa Data Transfer Procedure (Intra-Ring Communication 1)

Figure 8:
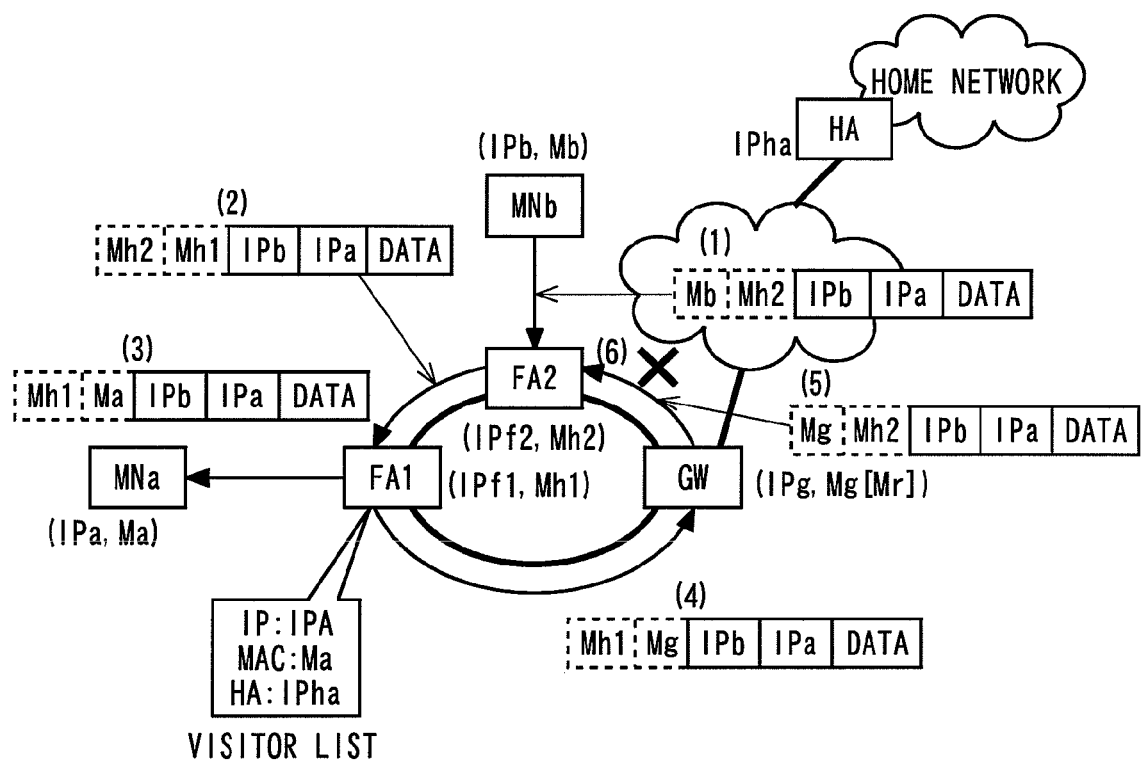
FIG. 8 is a block diagram that illustrates the procedure of data transfer from MNb to MNa of the first embodiment.
Figure 9:
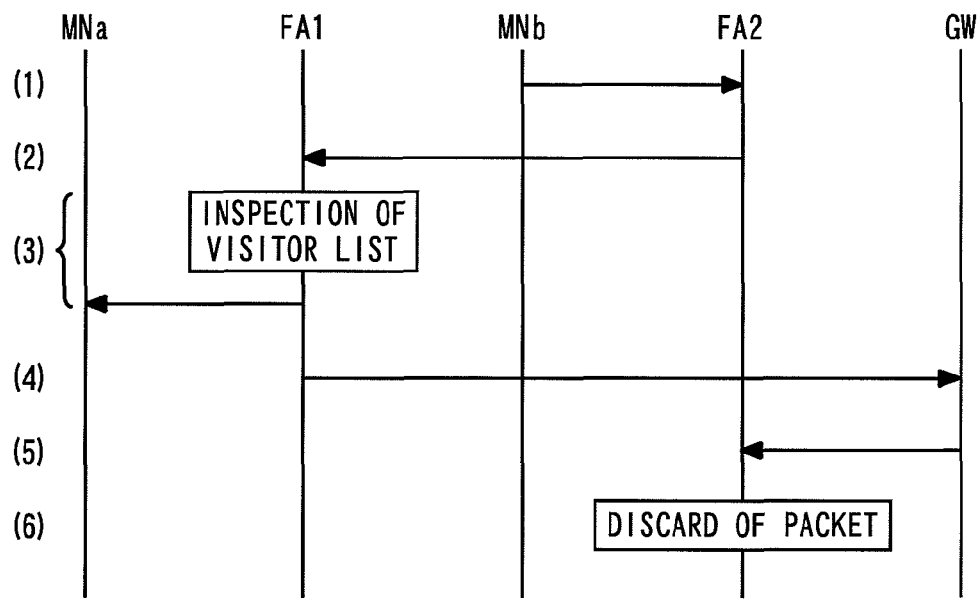
FIG. 9 is a sequence diagram that illustrates the procedure of data transfer from MNb to MNa of the first embodiment.

FIGS. 8 and 9 are a block diagram and a sequence diagram, respectively, that illustrate the procedure of data transfer from MNb to MNa, with nodes that are unnecessary for the description being omitted from illustration.

(1) To a MNa-addressed IP packet, with which MNb's own IP address (IPb) and the IP address (IPa) of the MNa are registered as the source IP address and the destination IP address, respectively, MNb furthermore registers its own MAC address (Mb) and FA2's MAC address (Mh2), which is registered as the gateway IP address in MNb's own routing table, as the source MAC address and the destination MAC address, respectively, and sends the IP packet.

(2) FA2 rewrites the source MAC address and the destination MAC address of the IP packet received from MNb to its own MAC address Mh2 and the MAC address Mh1 of FA1, respectively, and sends the IP packet to the predetermined FA1 link.

(3) FA1 inspects whether or not the destination MAC address of the received IP packet is registered in the visitor list, and here, since the address is registered, transfers the IP packet to the link to which MNa is connected, and MNa then receives the packet.

(4) FA1 furthermore rewrites the source MAC address and the destination MAC address of the received IP packet to its own MAC address (Mh1) and the MAC address (Mg) of the GW and transfers the packet to the predetermined GW link.

(5) The GW rewrites the source MAC address and the destination MAC address of the received IP packet to its own MAC address (Mg) and the FA2 MAC address (Mh2), respectively, and sends the IP packet to the predetermined FA2 link.

(6) FA2 inspects the received IP packet and discards the packet if it was sent by FA2 itself.

E: MNa→MNb Data Transfer Procedure (Intra-Ring Communication 2)

Figure 10:
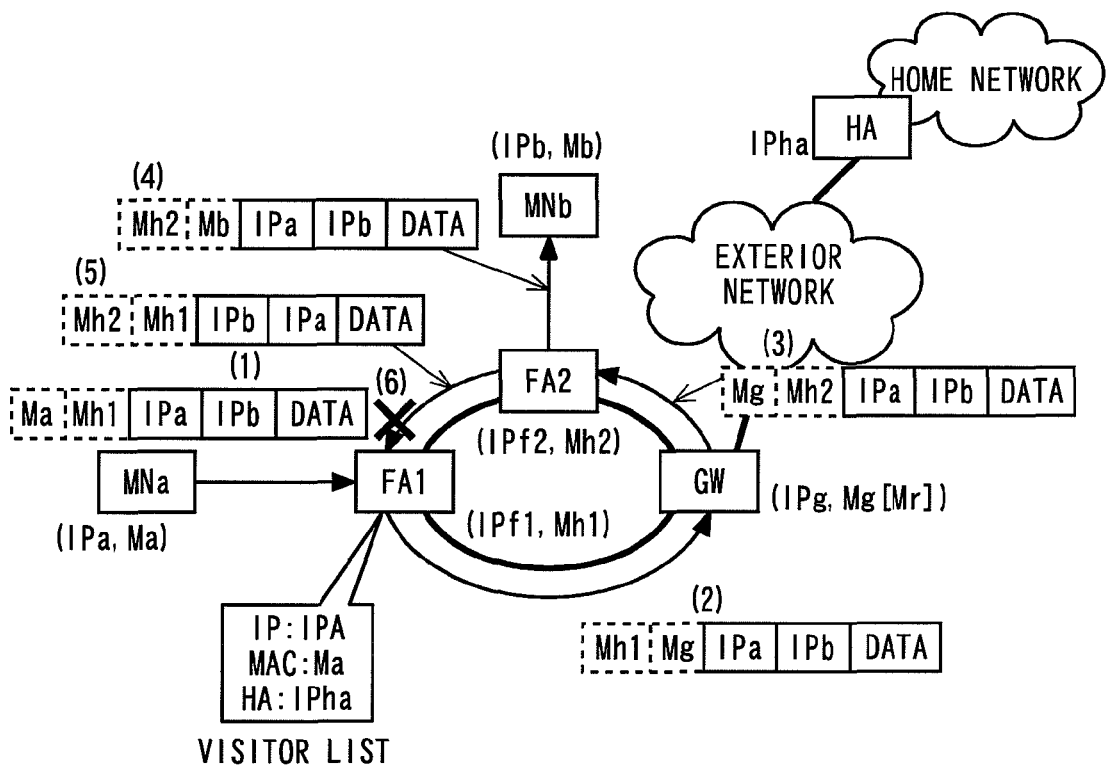
FIG. 10 is a block diagram that illustrates the procedure of data transfer from MNa to MNb of the first embodiment.
Figure 11:
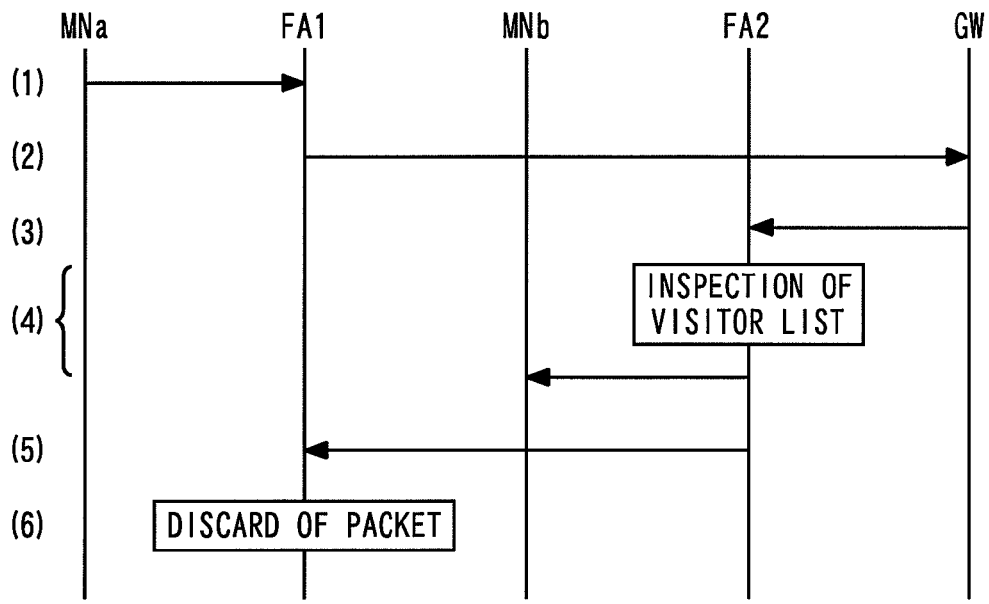
FIG. 11 is a sequence diagram that illustrates the procedure of data transfer from MNa to MNb of the first embodiment.

FIGS. 10 and 11 are a block diagram and a sequence diagram, respectively, that illustrate the procedure of data transfer from MNa to MNb, with nodes that are unnecessary for the description being omitted from illustration.

(1) To a CN-addressed IP packet, with which MNa's own IP address (IPa) and the IP address (IPb) of the MNb are registered as the source IP address and the destination IP address, respectively, MNa furthermore registers its own MAC address (Ma) and FA1's MAC address (Mh1), which is registered as the gateway IP address in MNa's own routing table, as the source MAC address and the destination MAC address, respectively, and sends the IP packet.

(2) Since the address of MNb is inside the ring, FA1, upon receiving the IP packet, rewrites the source MAC address and the destination MAC address of the received IP packet to its own MAC address (Mh1) and the MAC address (Mg) of the GW and transfers the packet to the predetermined GW link.

(3) Upon receiving this IP packet, the GW judges that the destination address is inside the ring, then rewrites the source MAC address and the destination MAC address of the received IP packet to its own MAC address (Mg) and the FA2 MAC address (Mh2), respectively, and sends the IP packet to the predetermined FA2 link.

(4) FA2 inspects whether or not the destination MAC address of the received IP packet is registered in the visitor list, and here, since the address is registered, transfers the IP packet to the link to which MNb is connected, and MNb then receives the packet.

(5) FA2 furthermore rewrites the MAC addresses of the received IP packet in the same manner as described above and sends the IP packet to FA1.

(6) FA1 inspects the received IP packet and discards the packet if it was sent by FA1 itself.

F: MNa Handoff Procedure

Figure 12:
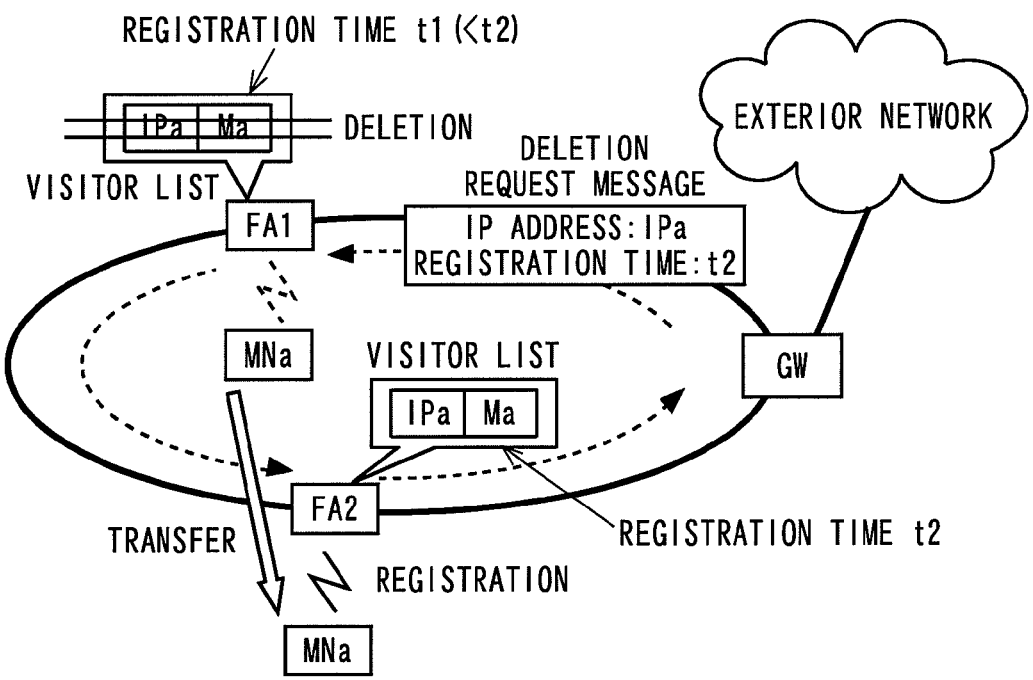
FIG. 12 is a block diagram that illustrates the MNa handoff procedure of the first and second embodiments.
Figure 13:
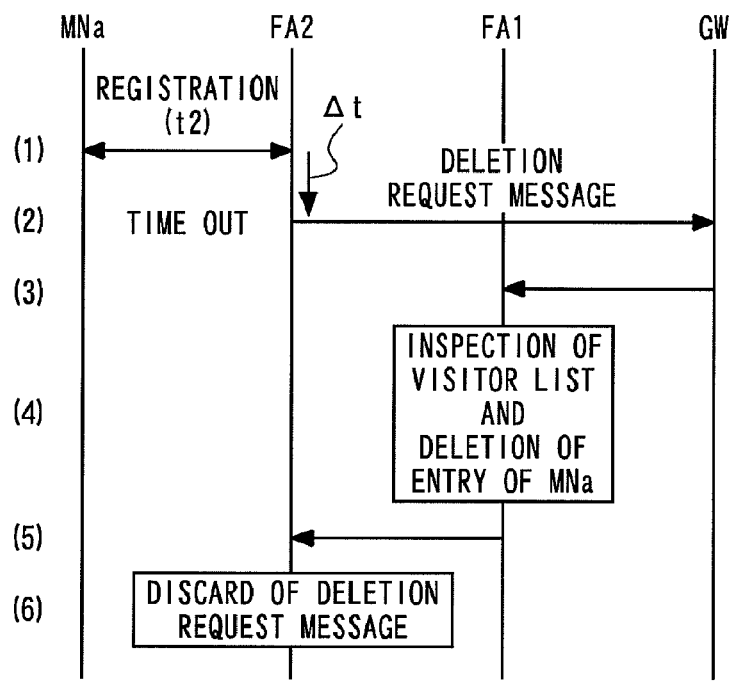
FIG. 13 is a sequence diagram that illustrates the MNa handoff procedure of the first and second embodiments.

FIGS. 12 and 13 are a block diagram and a sequence diagram, respectively, that illustrate the MNa handoff procedure, with nodes that are unnecessary for the description being omitted from illustration.

(1) MNa performs registration with FA1 at time t1 and thereafter moves (handoffs) to FA2 and completes registration with FA2 at time t2 in the same manner as the above.

(2) After the elapse of a predetermined time (t, FA2 transfers, to a neighbor link in one direction, a message requesting the deletion of the registered entries of the IP address (IPa) of MNa and the time t2 of completion of registration with FA2, and the GW receives this message.

(3) The GW transfers the received deletion request message to a neighbor link in the same direction.

(4) Upon receiving the deletion request message, FA1 references the visitor list, and if there are entries concerning MNa, compares the registration time (t1) thereof and the time information (t2) registered in the deletion request message. If t1<t2, FA1 deletes the relevant entries while if t1>t2, the entries are judged to be those of a newer registration and are not deleted.

(5) FA1 furthermore sends the deletion request message to FA2.

(6) FA2 inspects the received deletion request message and discards the deletion request message if it was sent by FA2 itself.

As with the above-described embodiment, since an IP packet transferred to the GW from the external network is passed through all of the FAs regardless of its destination, the GW does not need to manage the accommodation location of each mobile node and does not have to execute a routing process. Also, since the routing process within the network is restricted to the FA that accommodates the mobile node, the processing speed is improved.

Furthermore, with the present embodiment, since the registration destination of an MN is restricted to an FA and registration with the HA is not required, communication is enabled immediately after registration with the FA and functions equivalent to simultaneous bindings of the mobile IP standards can be realized in a simple manner.

Furthermore with the present embodiment, even if the GW receives packets addressed to MNs, there is no need to recognize the accommodating FAs and all packets need only to be transferred to a neighbor link in a predetermined direction. Since a procedure for sending an ARP (address resolution protocol) for recognizing the MAC address of a destination based on the destination address of a received packet, a procedure for receiving the MAC address returned to the ARP, etc., are made unnecessary, the throughput is improved.

The arrangement of a second embodiment of a ring-like network to which this invention is applied shall now be described. With this embodiment, the IP address (IPA) on the home network is allocated to MNa and the IP address (IPb) on the ring-like network is allocated to MNb.

G: Registration Procedure

Figure 14:
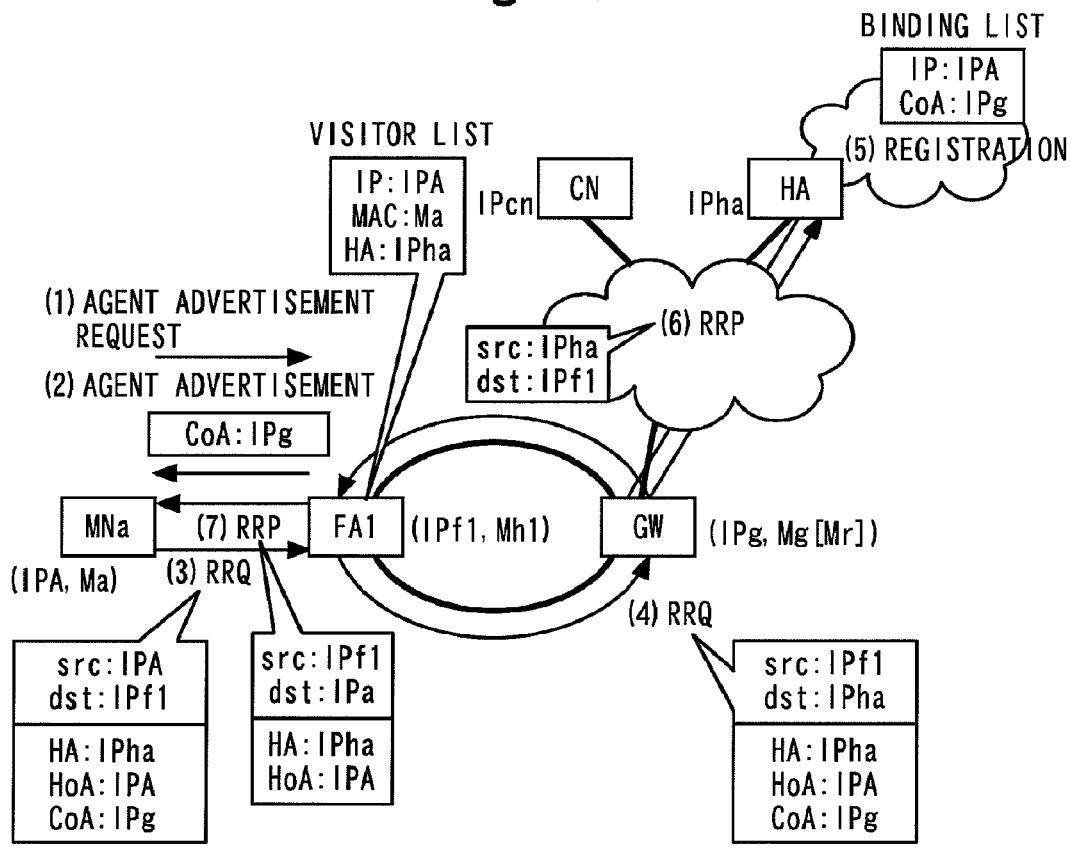
FIG. 14 is a block diagram that illustrates the registration procedure of the second embodiment.
Figure 15:
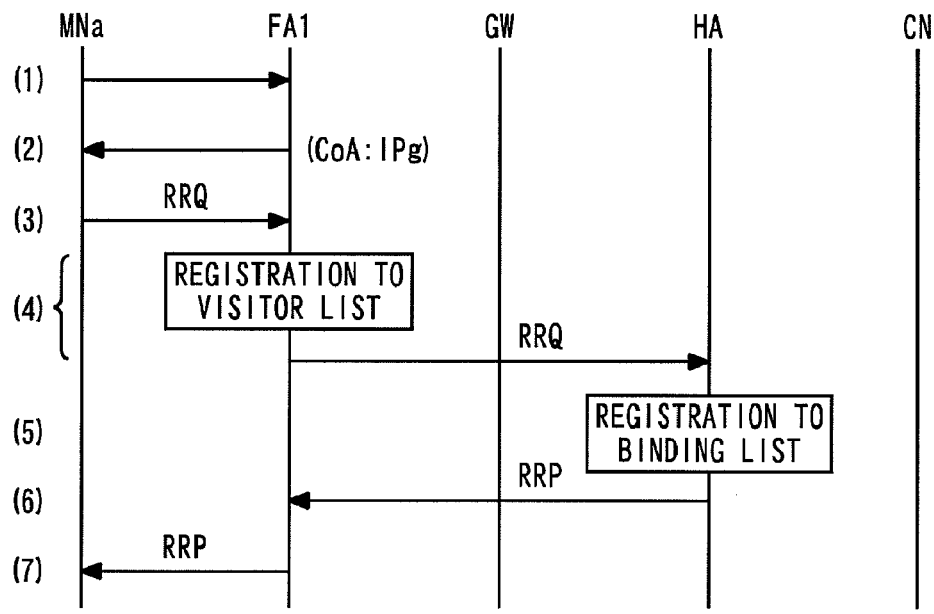
FIG. 15 is sequence diagram that illustrate the registration procedure of the second embodiment.

FIGS. 14 and 15 are a block diagram and a sequence diagram, respectively, that illustrate the registration procedure of the second embodiment of this invention, with nodes that are unnecessary for the description being omitted from illustration.

(1) Prior to registration, MNa broadcasts or multicasts an Agent Advertisement Request.

(2) FA1, which receives the Agent Advertisement Request, broadcasts or multicasts an Agent Advertisement. The CoA (Care Of Address) in the Agent Advertisement is set to the IP address (IPg) of the GW.

(3) To FA1, which sends the Agent Advertisement, MNa sends a Registration Request RRQ, with the home agent being set to the IP address (IPha) of the HA, the home address (HoA) being set to MNa's own address (IPA) on the home network, and the CoA being set to the IP address (IPg) of the GW.

(4) As information concerning MNa, FA1 stores the IP address (IPA) and MAC address (Ma) of MNa and the IP address (IPha) of the HA in the visitor list and transfers the above-mentioned RRQ to the HA. This RRQ is transferred to the HA via the GW.

(5) Upon receiving the above-mentioned RRQ, the HA registers the IP address (IPA) and the CoA of MNa as entries concerning MNa in its own binding list.

(6) The HA sends a Registration Reply (RRP) to the FA1 that sent the above-mentioned RRQ. This RRP is transferred to FA1 via the GW.

(7) Upon receiving the above-mentioned RRP, FA1 sends this to MNa.

H: CN→MNa Data Transfer Procedure

Figure 16:
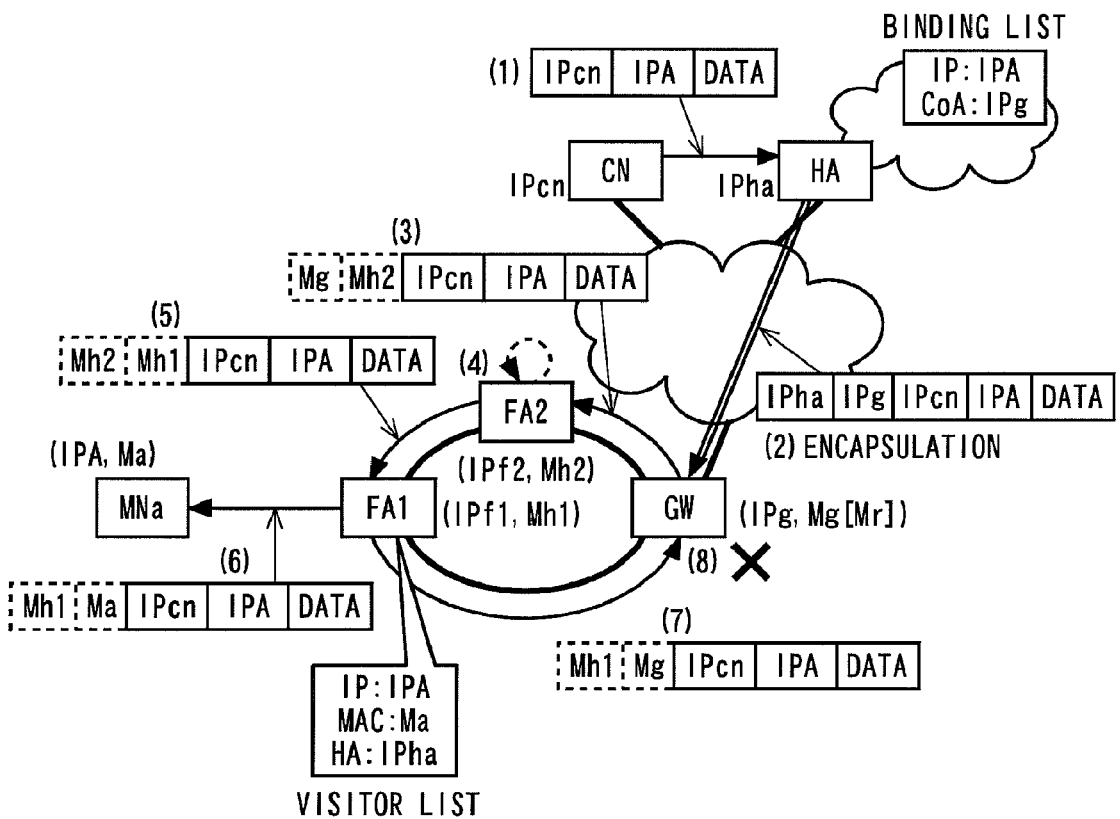
FIG. 16 is a block diagram that illustrates the procedure of data transfer from the CN to MNa of the second embodiment.
Figure 17:
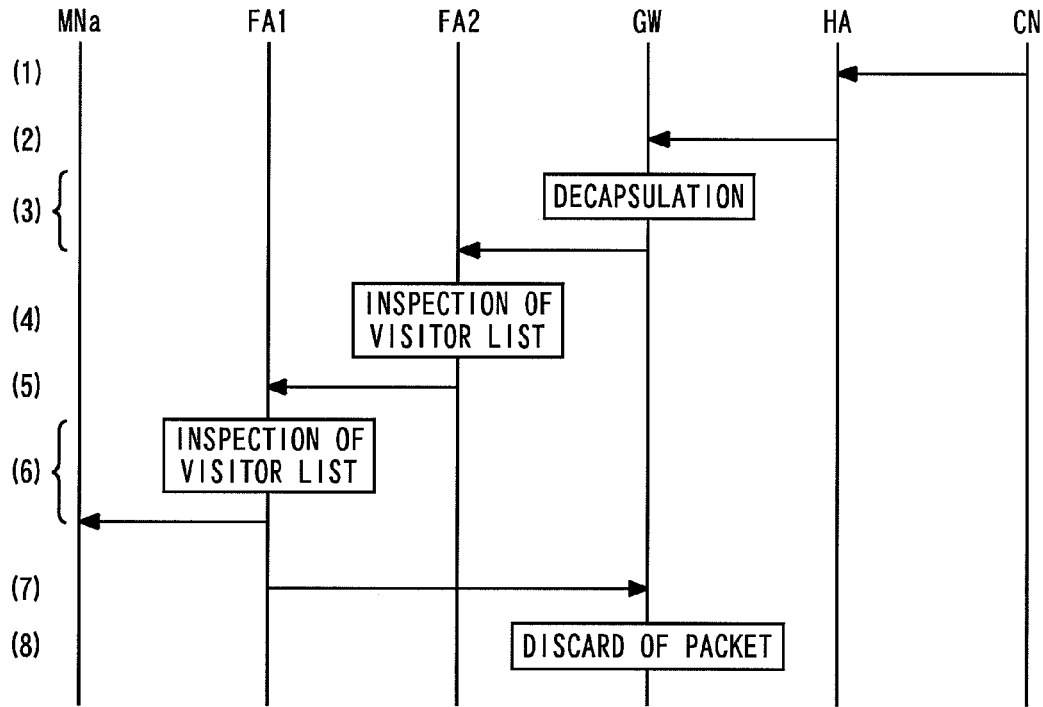
FIG. 17 is a sequence diagram that illustrates the procedure of data transfer from the CN to MNa of the second embodiment.

FIGS. 16 and 17 are a block diagram and a sequence diagram, respectively, that illustrate the procedure of data transfer from the CN to MNa, with nodes that are unnecessary for the description being omitted from illustration.

(1) An MNa-addressed IP packet sent from the CN arrives at the HA by normal IP routing.

(2) The HA references its own binding list and confirms that a CoA is registered in regard to the destination address (IPA) of the received IP packet. The HA then encapsulates this IP packet, attaches the CoA (IPg), and transfers the packet.

(3) The GW receives and decapsulates the encapsulated packet and transfers the IP packet to the FA2 link upon registering its own MAC address (Mg) and the MAC address (Mh2) of FA2 as the source MAC address and the destination MAC address, respectively, therein.

(4) FA2 inspects whether or not the destination address of the received IP packet is registered in the visitor list, and here, since the address is not registered, the process of transfer to an MN is not carried out.

(5) FA2 furthermore rewrites the source MAC address and the destination MAC address of the received IP packet in the same manner as described above and sends the IP packet to the FA1 link.

(6) FA1 inspects whether or not the destination address of the received IP packet is registered in the visitor list, and here, since the address is registered, transfers the received packet to the link to which MNa is connected, and MNa then receives the packet.

(7) FA1 furthermore rewrites the source MAC address and the destination MAC address of the received packet in the same manner as described above and sends the packet to the GW link.

(8) The GW inspects the received IP packet and discards the packet if it was sent by the GW itself.

I: MNa→CN Data Transfer Procedure

Figure 18:
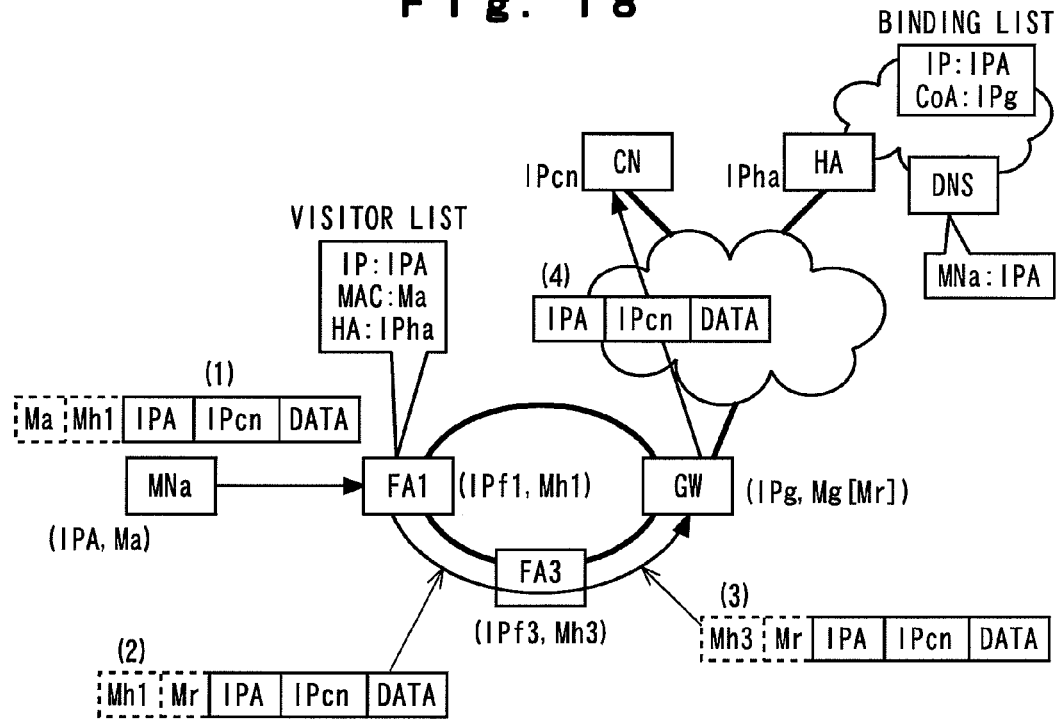
FIG. 18 is a block diagram that illustrates the procedure of data transfer from MNa to the CN of the second embodiment.
Figure 19:
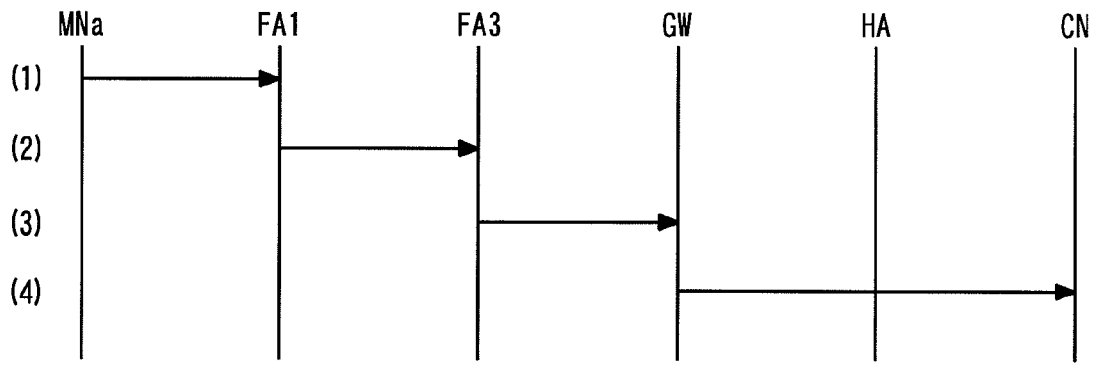
FIG. 19 is a sequence diagram that illustrates the procedure of data transfer from the CN to MNa of the second embodiment.

FIGS. 18 and 19 are a block diagram and a sequence diagram, respectively, that illustrate the procedure of data transfer from MNa to the CN on the external network, with nodes that are unnecessary for the description being omitted from illustration.

(1) Since the MAC address (Mh1) of FA1 is registered as the gateway address in the routing table of MNa, an IP packet addressed to the CN is transferred to FA1.

(2) Upon receiving the IP packet, FA1 rewrites the destination address to Mr, which is the generic designation for addresses outside the ring, since the destination IP address (IPcn) is outside the ring and then transfers the IP packet in a predefined direction along the ring.

(3) Though this IP packet is received by FA3, since the destination MAC address is Mr, inspection of the visitor list is not performed and the packet is transferred as it is to the GW.

(4) Upon receiving the IP packet, the GW judges that the destination address is outside the ring and transfers the packet to the external network. The IP packet that has been transferred to the external network is transferred to the CN in accordance with normal IP routing.

J: MNb→MNa Data Transfer Procedure (Intra-Ring Communication 1)

Figure 20:
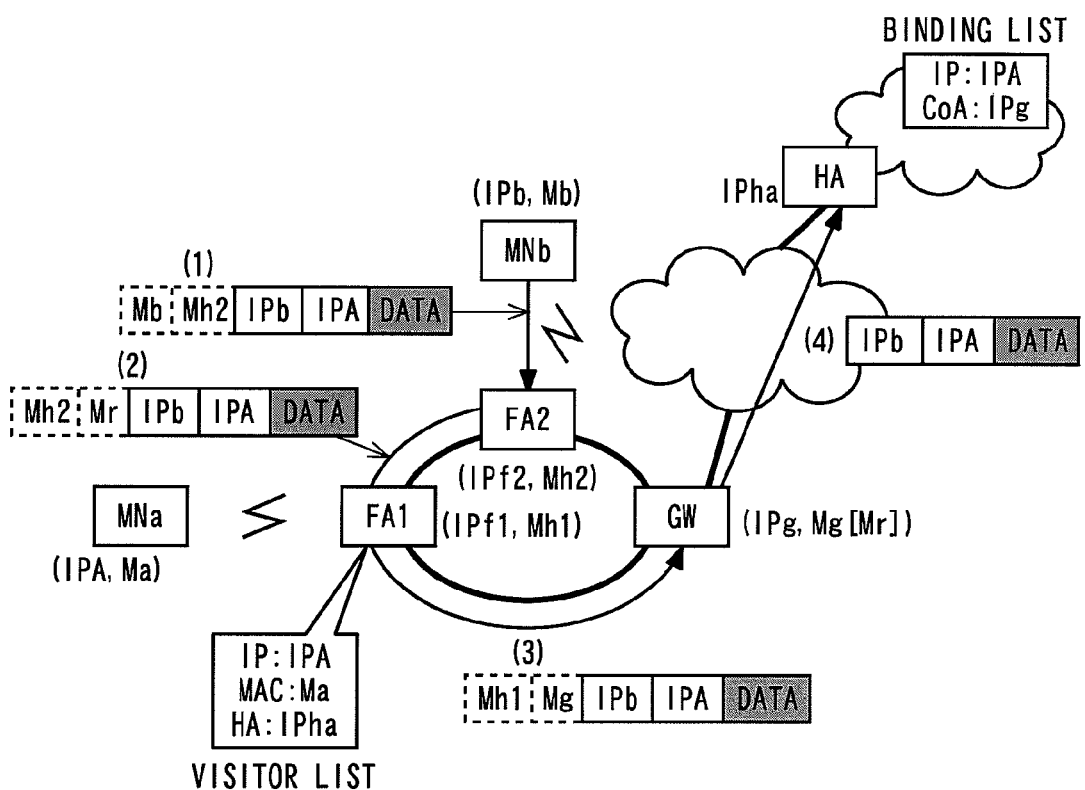
FIG. 20 is a block diagram (1) that illustrates the procedure of data transfer from MNb to MNa of the second embodiment.
Figure 21:
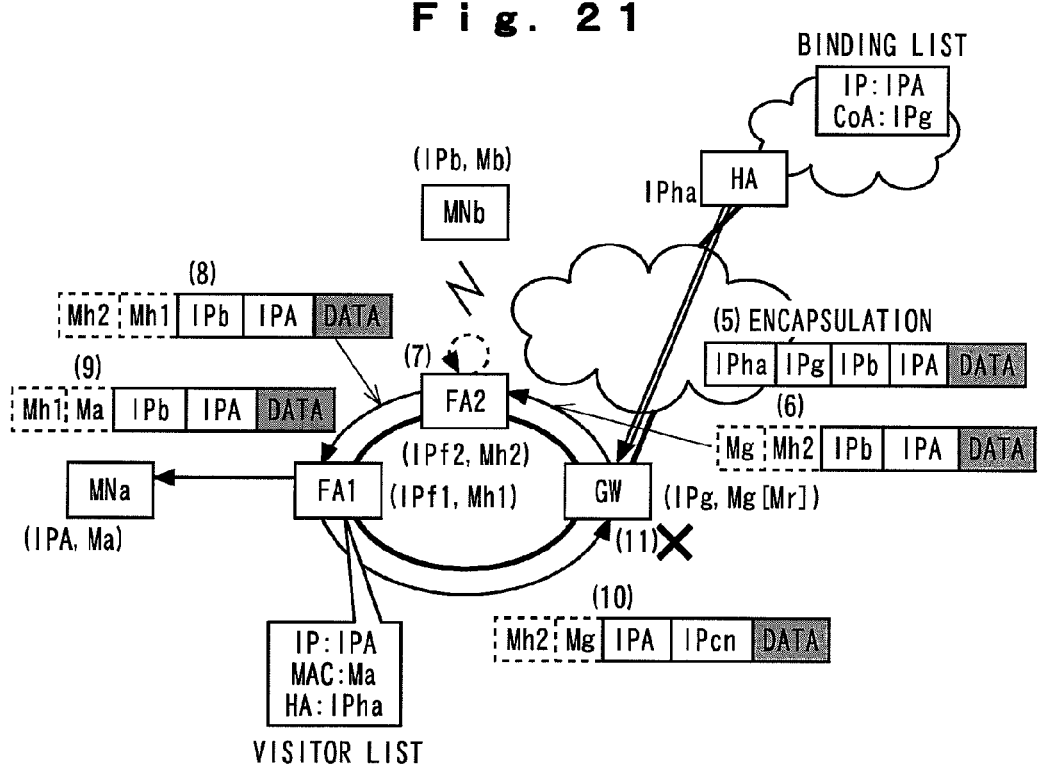
FIG. 21 is a block diagram (2) that illustrates the procedure of data transfer from MNb to MNa of the second embodiment.
Figure 22:
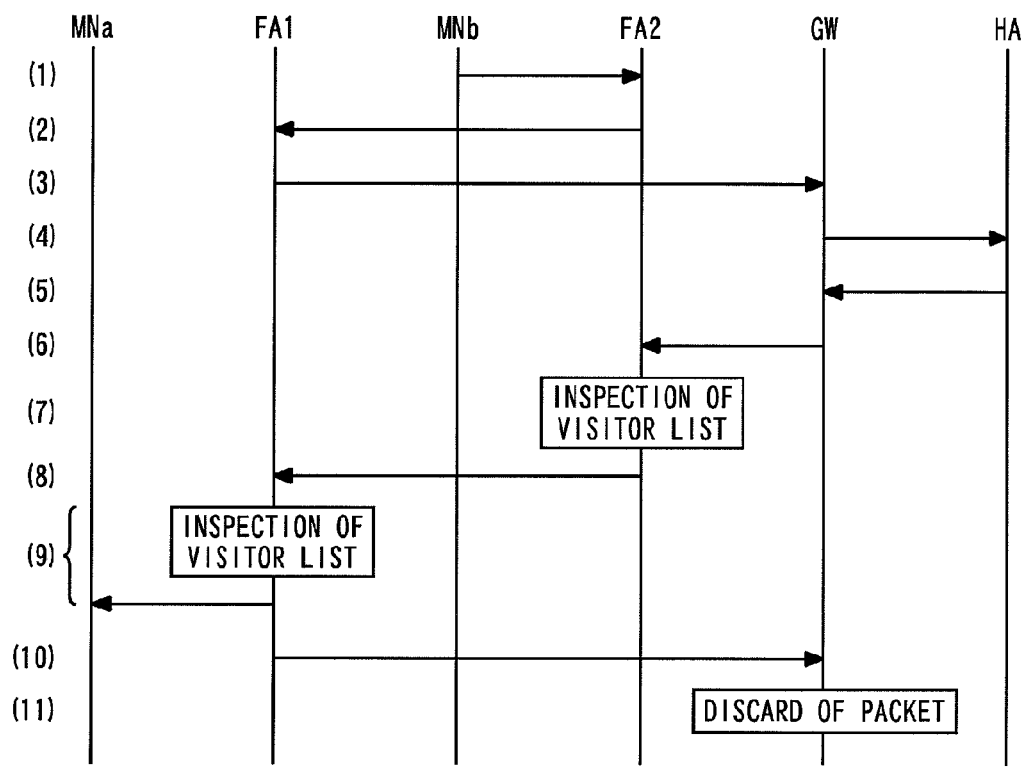
FIG. 22 is a sequence diagram that illustrates the procedure of data transfer from MNb to MNa of the second embodiment.

FIGS. 20 and 21 are block diagrams that illustrate the procedure of data transfer from MNb to MNa, and FIG. 22 is a sequence diagram thereof.

(1) Since the MAC address (Mh2) of FA2 is registered as the gateway address in the routing table of MNb, an IP packet addressed to MNa is transferred to FA2.

(2) Upon receiving the MNa-addressed IP packet, FA2 sets the destination address to (Mr) since the destination address (IPA) of MNa is outside the ring and then transfers the IP packet in the predefined direction along the ring.

(3) Upon receiving the IP packet, FA1 transfers the IP packet to GW without referencing the visitor list since the destination MAC address is Mr.

(4) Upon receiving the IP packet, the GW judges that the destination address is outside the ring and transfers the packet to the external network. The IP packet that has been sent to the external network is transferred to the HA in accordance with normal IP routing.

(5) The HA references its own binding list and confirms that a CoA is registered in regard to the destination address (IPA) of the received IP packet. The HA then encapsulates this IP packet, attaches the CoA (IPg), and transfers the packet.

(6) The GW receives and decapsulates the encapsulated packet and transfers the IP packet to the FA2 link upon registering its own MAC address (Mg) and the MAC address (Mh2) of FA2 as the source MAC address and the destination MAC address, respectively, therein.

(7) FA2 inspects whether or not the destination address of the received IP packet is registered in the visitor list, and here, since the address is not registered, the process of transfer to a mobile node is not carried out.

(8) FA2 furthermore rewrites the source MAC address and the destination MAC address of the received IP packet in the same manner as described above and sends the IP packet to the FA1 link.

(9) FA1 inspects whether or not the destination address of the received IP packet is already registered in the visitor list, and here, since the address is registered, transfers the received packet to the link to which MNa is connected, and MNa then receives the packet.

(10) FA1 furthermore rewrites the source MAC address and the destination MAC address of the received packet in the same manner as described above and sends the packet to the GW link.

(11) The GW inspects the received IP packet and discards the packet if it was sent by the GW itself.

K: MNa→MNb Data Transfer Procedure (Intra-Ring Communication 2)

Since MNb is an address inside the ring, this procedure is the same as the procedure described with FIGS. 10 and 11 above.

With the present embodiment, even when MNa has a home network address, communication of high throughput is enabled in a ring-like network.

Figure 23:
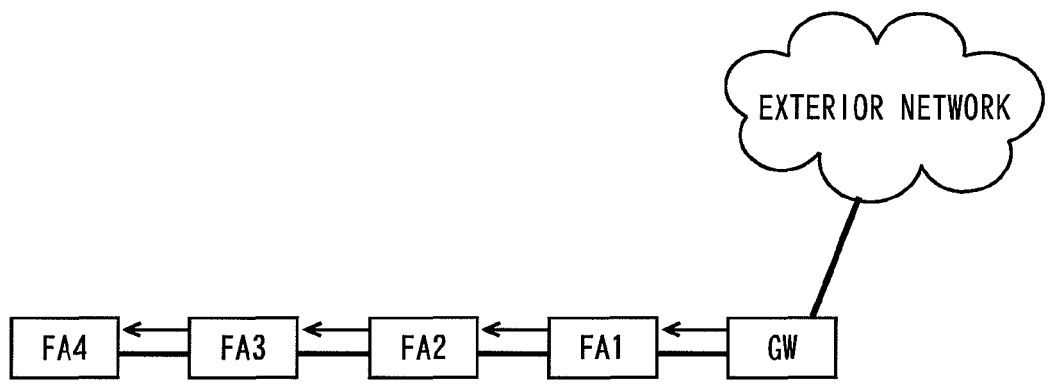
FIG. 23 is a block diagram showing a third embodiment of a mobile network to which this invention is applied.

FIG. 23 is a block diagram showing the arrangement of a third embodiment of a mobile network to which this invention is applied and here, a GW and a plurality (four in the present embodiment) of FAs are linked together in a line-like manner with the GW at the head and in the order of: GW R FA1 R FA2 R FA3 R FA4; and connection with the internet or other external network is made at the GW.

The registration procedure and data transfer procedures for mobile nodes in such a line-like mobile network shall now be described in detail.

L: Registration Procedure

Figure 24:
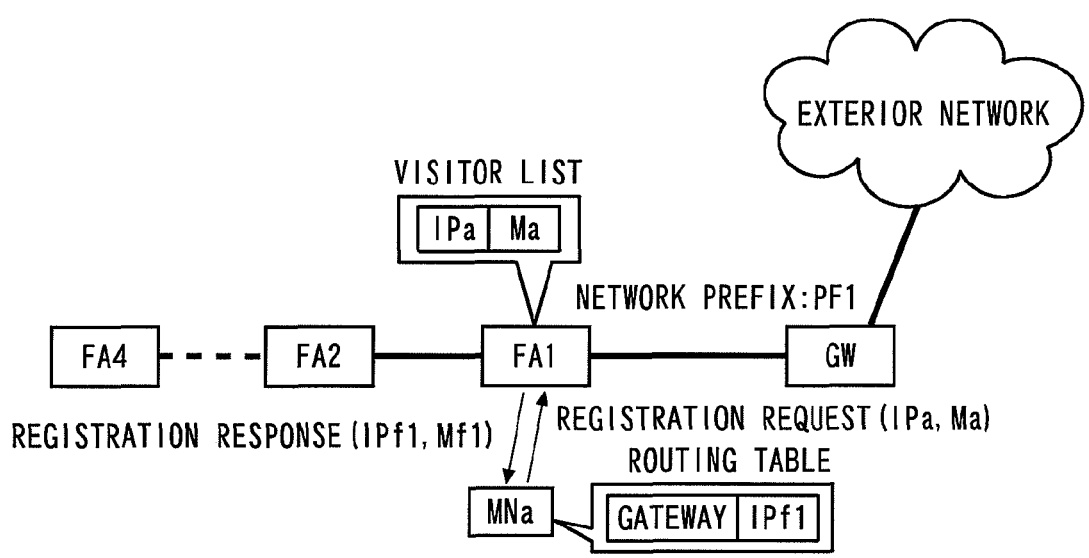
FIG. 24 is a block diagram illustrating the registration procedure of the third embodiment.

FIG. 24 is a block diagram illustrating the registration procedure and since the sequence diagram of this procedure is the same as that of FIG. 3 described above, illustration thereof shall be omitted.

(1) Prior to registration, MNa broadcasts or multicasts an Agent Advertisement Request.

(2) An FA (FA1 in the present case) that receives the Agent Advertisement Request broadcasts or multicasts an Agent Advertisement.

(3) To FA1 that sends the Agent Advertisement, MNa sends a Registration Request (RRQ) that contains MNa's own IP address and MAC address.

(4) Upon receiving the IP address (IPa) and the MAC address (Ma) from MNa, FA1 registers these in the visitor list of its own node.

(5) FA1 furthermore sends a RRP that contains its own IP address (IPf1) and MAC address (Mf1) to the MNa.

(6) Upon receiving the above-mentioned IP address (IPf1) and MAC address (Mf1) from FA1, MNa registers the IP address (IPf1) as the gateway IP address in its own routing table.

M: CN→MNa Data Transfer Procedure

Figure 25:
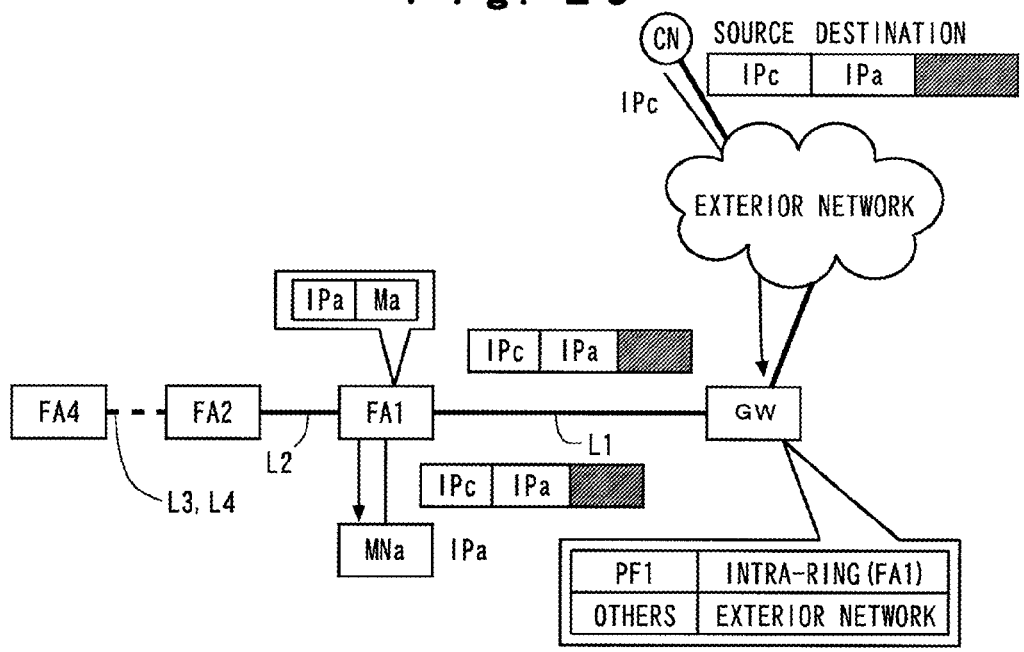
FIG. 25 is a block diagram that illustrates the procedure of data transfer from the CN to MNa of the third embodiment.
Figure 26:
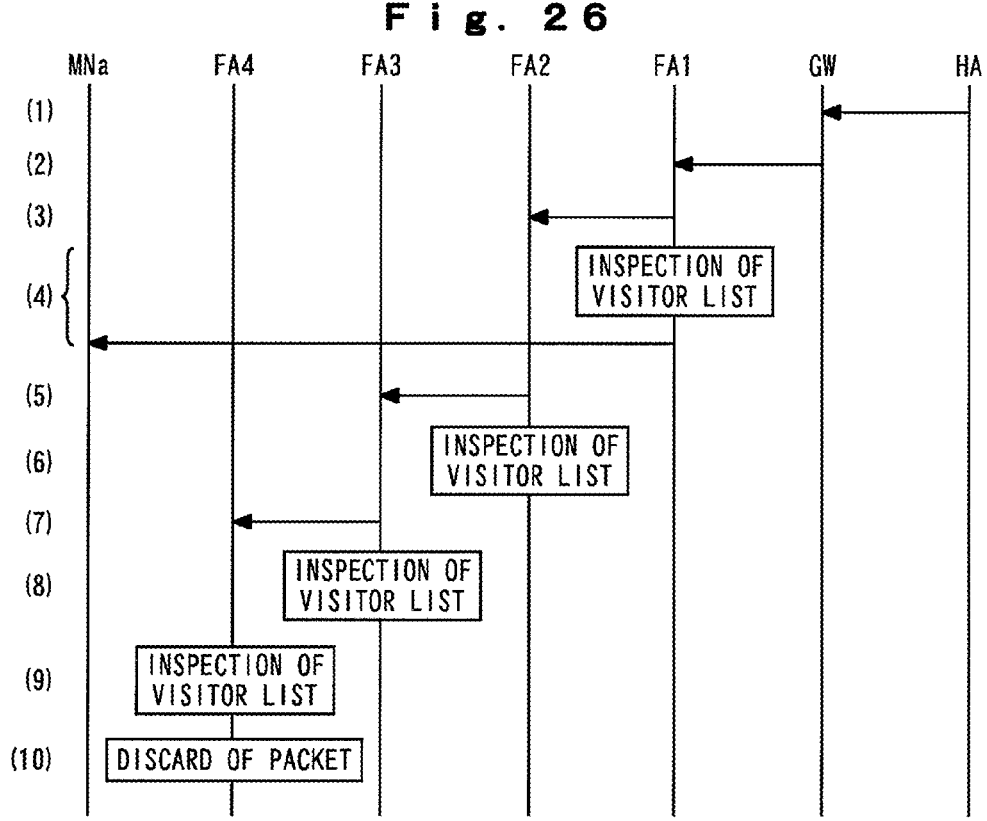
FIG. 26 is a sequence diagram that illustrates the procedure of data transfer from the CN to MNa of the third embodiment.

FIGS. 25 and 26 are a block diagram and a sequence diagram, respectively, that illustrate the procedure of data transfer from the CN to MNa.

(1) An MNa-addressed IP packet sent from the CN arrives at the gateway GW by normal IP routing.

(2) The GW judges the destination address of the received IP packet to be inside the line and transfers the packet to a link L1.

(3) Upon receiving the IP packet sent by the GW, FA1 transfers the received IP packet to a link L2 at the downstream side (side opposite the GW side).

(4) FA1 further more inspects whether or not the destination address of the received IP packet is registered in the visitor list, and if the address is registered, also transfers the IP packet in the direction in which MNa is connected (link L4), and MNa receives this packet.

(5) FA2 transfers the received IP packet to a downstream link L3.

(6) FA2 furthermore inspects whether or not the destination address of the received IP packet is registered in the visitor list, and here, since the address is not registered, the inspection is ended as it is.

(7) FA3 transfers the received IP packet to the downstream link L4.

(8) FA3 furthermore inspects whether or not the destination address of the received IP packet is registered in the visitor list, and here, since the address is not registered, the inspection is ended as it is.

(9) FA4 inspects whether or not the destination address of the received IP packet is registered in the visitor list, and here, since the address is not registered, the inspection is ended as it is.

(10) FA4 furthermore discards the received IP packet since an FA does not exist at its downstream side.

N: MNa→CN Data Transfer Procedure

Figure 27:
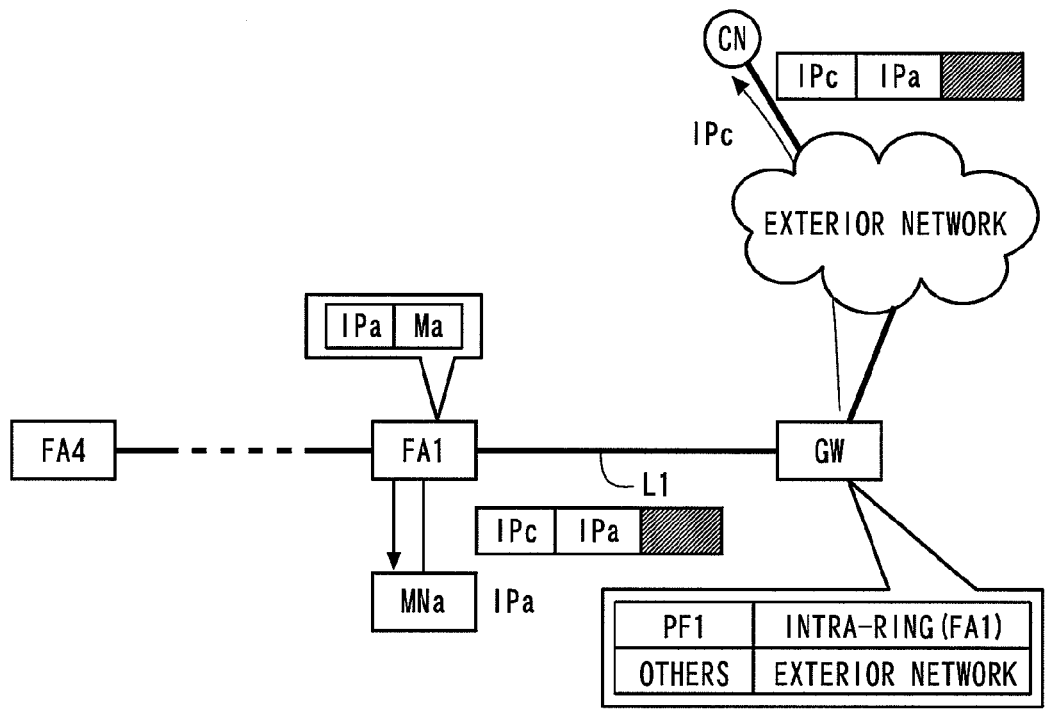
FIG. 27 is a block diagram that illustrates the procedure of data transfer from MNa to CN of the third embodiment.
Figure 28:
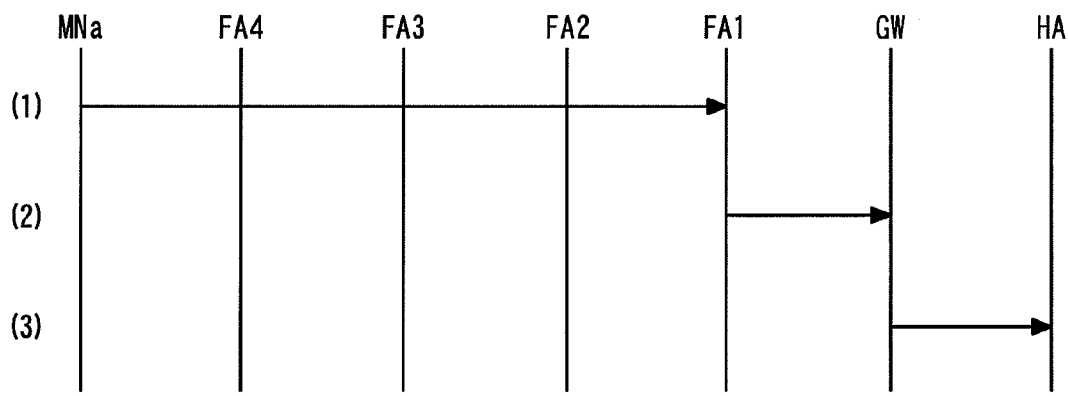
FIG. 28 is a sequence diagram that illustrates the procedure of data transfer from MNa to CN of the third embodiment.

FIGS. 27 and 28 are a block diagram and a sequence diagram, respectively, that illustrate the procedure of data transfer from MNa to the CN on the external network, with nodes that are unnecessary for the description being omitted from illustration.

(1) A CN-addressed IP packet is transferred to FA1, which is registered as the gateway IP address in the routing table of MNa.

(2) Upon receiving the CN-addressed IP packet from link L4, FA1 judges the destination address thereof to be the external network and transfers the IP packet to link L1 at the upstream side (the GW side).

(3) Upon receiving the IP packet, the GW judges the prefix of the destination address to indicate the exterior of the ring and transfers the IP packet to the external network. The IP packet that has been transferred to the external network is transferred to the CN in accordance with normal IP routing.

O: MNa Handoff Procedure

Figure 29:
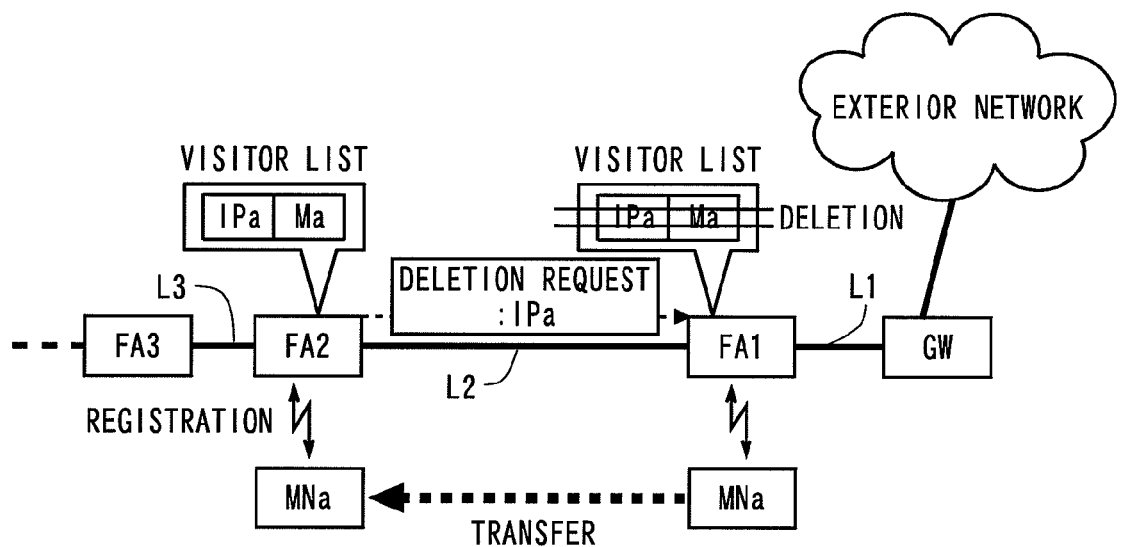
FIG. 29 is a block diagram that illustrates the MNa handoff procedure of the third embodiment.
Figure 30:
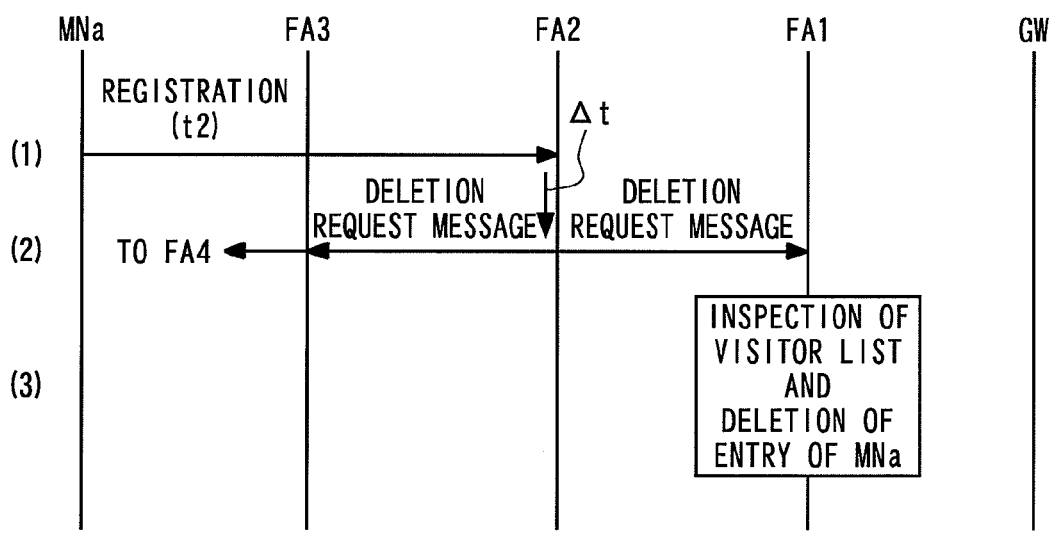
FIG. 30 is a sequence diagram that illustrates the MNa handoff procedure of the third embodiment.
Figure 31:
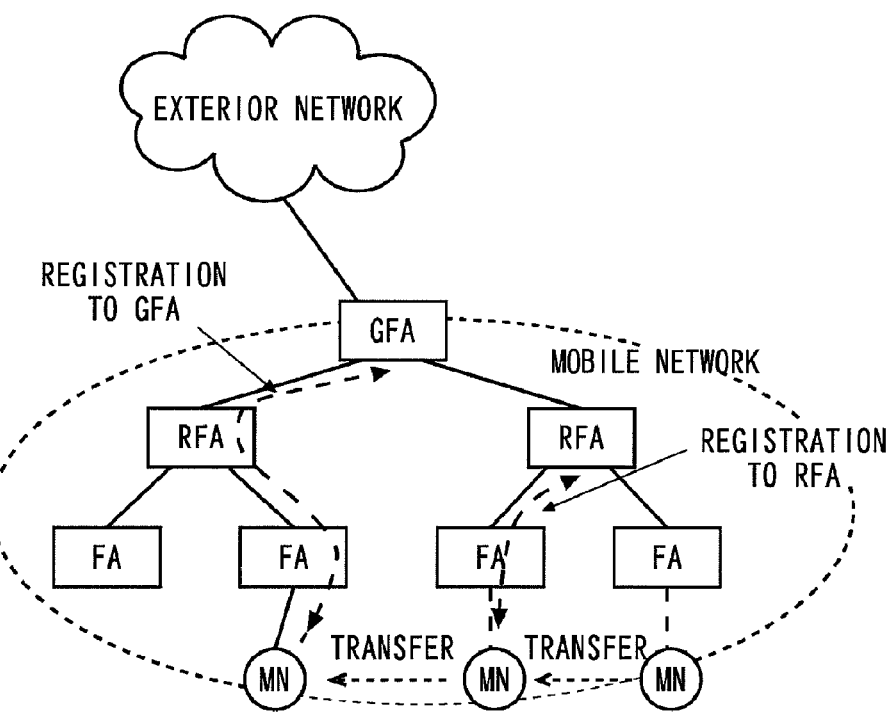
FIG. 31 shows a network arrangement for carrying out localized registration.
Figure 32:
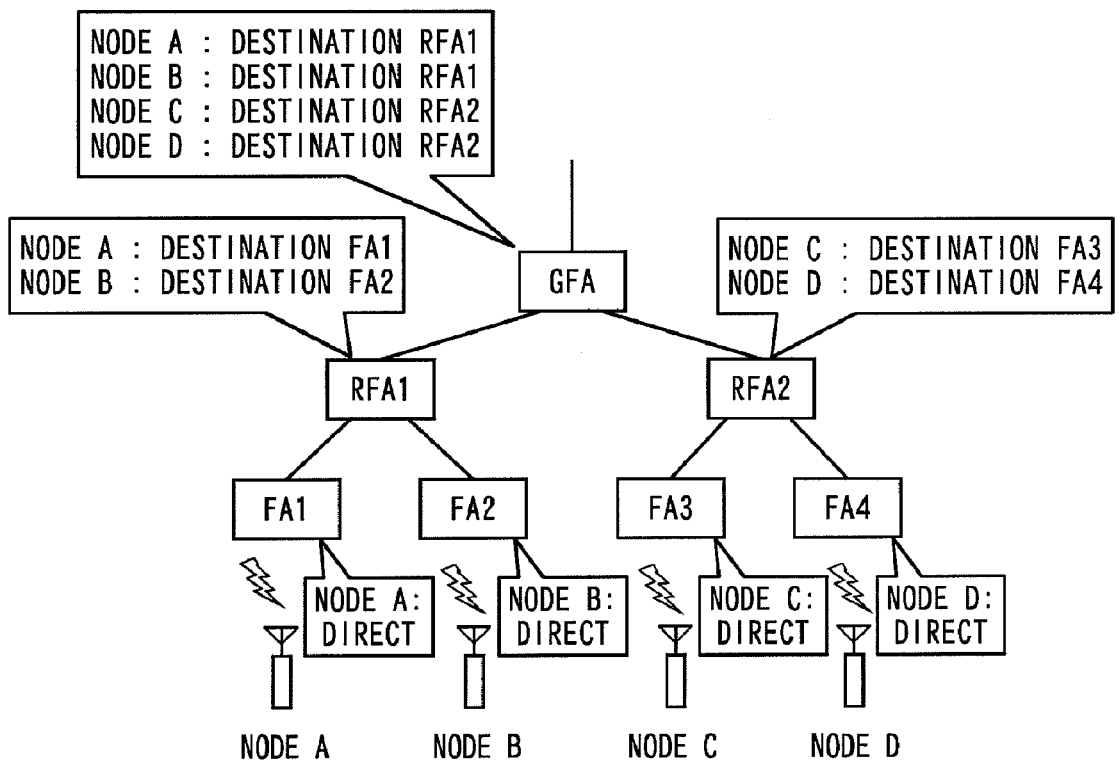
FIG. 32 schematically shows the mobile node information that each FA must accommodate when the FAs are positioned hierarchically.

FIGS. 29 and 30 are a block diagram and a sequence diagram, respectively, that illustrate the MNa handoff procedure.

(1) MNa performs registration with FA1 at time t1 and thereafter moves (handoffs) to FA2 and completes registration with FA2 at time t2 in the same manner as the above.

(2) After the elapse of a predetermined time (t, FA2 transfers, to links L3 and L2 in one direction and the other direction, a message requesting the deletion of the registered entries of the IP address (IPa) of MNa and the time t2 of completion of registration with FA2.

(3) Upon receiving the deletion request message, each of FA1 and FA3 references the visitor list, and if there are entries concerning MNa, compares the registration time (t1) thereof and the time information (t2) registered in the deletion request message. If t1<t2, the relevant entries are deleted while if t1>t2, the entries are judged to be those of a newer registration and are not deleted.

As with the above-described first embodiment, with the present invention, since an IP packet transferred to the GW from the external network is passed through all of the FAs regardless of its destination, the GW does not need to manage the accommodation location of each mobile node and does not have to execute a routing process. Also, since the routing process within the network is restricted to the FA that accommodates the mobile node, the processing speed is improved.

Furthermore, in comparing the present embodiment with the first and second embodiments, not only is there no need to return the IP packet from the FA (FA4) at the tail end to the GW, but since an IP packet received by an intermediate FA (FA1, FA2, or FA3) from an accommodated node arrives at the GW without passing through the FAs that are at the downstream side (side opposite the GW side) of each FA, the path can be shortened and corresponding improvement of the processing speed is enabled in comparison to the first and second embodiments.

INDUSTRIAL APPLICABILITY

The following effects are achieved by this invention.

(1) By connecting FAs along a ring, routing among FAs is eliminated and data transfer of higher speeds than those achievable by conventional arts can be realized in circumstances where a mobile node moves locally.

(2) Since each FA needs to store only the addresses of mobile nodes that it accommodates on its own, even if the number of mobile nodes increases, the storage area of an FA does not have to be increased.

(3) Since when a mobile node moves to a new FA, communication is enabled immediately after completion of registration with the FA, communication of short handover is enabled.

The invention claimed is:

1. The communication method for a mobile network, wherein a gateway GW and a plurality of foreign agents FA (FA1 to FAn) are provided in a mobile network, and corresponding nodes, on an external network connected to the gateway GW, communicate with mobile nodes, on the mobile network, via the gateway GW and foreign agents FA, the mobile network communication method being characterized in that the gateway GW and the plurality of foreign agents FA are connected in a ring-like manner, with a packet being transferred containing a destination address of a predetermined neighbor foreign agent FA or gateway GW, and said method comprising:

a mobile node requesting registration with one of said foreign agents FA;

said one foreign agent FA registering address information of the mobile node in a visitor list in response to the registration request;

the packet sent from a corresponding node to the mobile node being received by gateway GW;

rewriting a source address of the received packet with an address of the gateway GW, rewriting the destination address of the received packet with an address of the predetermined foreign agent FA connected to a link in one direction, and transferring the received packet;

after a current foreign agent FA receives the packet from the foreign agent FA connected to the link in the other direction, rewriting the source address of the received packet with an address of the current foreign agent FA, rewriting the destination address of the received packet with an address of the predetermined foreign agent FA connected to the link in said one direction, and transferring the packet, and this being repeated by each foreign agent FA;

each foreign agent FA, to which the packet is transferred, searching for the destination address in its own visitor list; and the foreign agent FA, for which the destination address of the received packet is already registered in the visitor list, transferring the received packet to the link connected to the mobile node.

2. The mobile network communication method according to claim 1, further comprising:

the mobile node transferring the packet, addressed to the corresponding node, to one foreign agent;

the one foreign agent transferring the packet to a foreign agent FA neighbor in one direction, the foreign agent FA transferring the packet to another foreign agent FA neighbor in the same direction, and this being repeated until the packet reaches the gateway GW; and the gateway GW receiving the packet and transferring the packet to the external network.

3. The mobile network communication method according to claim 1, further comprising:

the mobile node, on a mobile network, transferring the packet, addressed to another mobile node on the mobile network, to one foreign agent FA;

rewriting the source address of the packet received from the mobile node with an address of the one foreign agent FA, rewriting the destination address of the received packet with an address of the predetermined foreign agent FA connected to the link in said one direction, and transferring the packet, and this being repeated by each foreign agent FA;

each foreign agent FA, to which the packet is transferred, searching for the destination address in its own visitor list; and the foreign agent FA, for which the destination address of the received packet is already registered in the visitor list, transferring the received packet to the link connected to the mobile node.

4. A mobile network, comprising a gateway GW and a plurality of foreign agents FA (FA1 to FAn) and mediating communication between corresponding nodes, on an external network connected to the gateway GW, and mobile nodes, accommodated by the foreign agents FA, the mobile network further comprising:

a plurality of link means, connecting the gateway GW and the plurality of foreign agents FA in a ring-like manner, with a packet being transferred containing a destination address of a predetermined neighbor foreign agent FA or gateway GW;

a visitor list, which is equipped by each foreign agent FA and manages the addresses of mobile nodes that have been subject to registration;

a means, which is equipped by each foreign agent FA, for rewriting a source address of a packet transferred from the gateway GW with an address of the foreign agent FA, rewriting a destination address of the packet with an address of the predetermined foreign agent FA connected to a link in one direction, and transferring the packet;

a means, which is equipped by each foreign agent FA and, if a packet transferred from the gateway GW is addressed to a mobile node that has been subject to registration, transfers the packet to the mobile node;

a means, which is equipped by each foreign agent FA and transfers a packet, sent from a registered mobile node and addressed to a corresponding node, to a foreign agent FA in one direction; and a means, which is equipped in the gateway GW and transfers a packet, transferred from the foreign agent FA and addressed to the corresponding node on the external network, to the external network.

* * * * *